July 28, 1942.     W. A. BRUNO     2,291,070
CONNECTING DEVICE
Filed Sept. 3, 1941     2 Sheets-Sheet 1
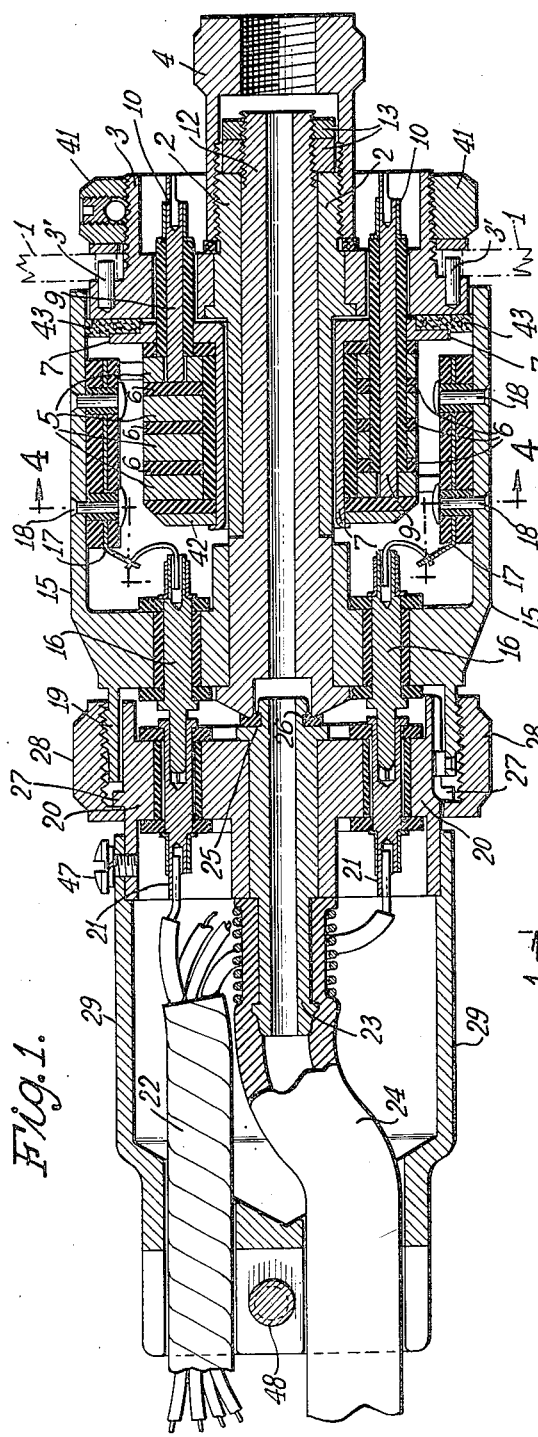
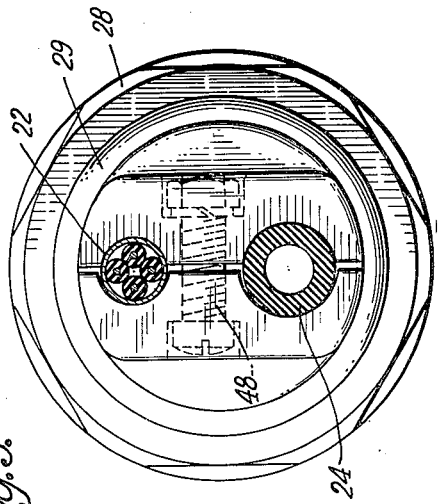
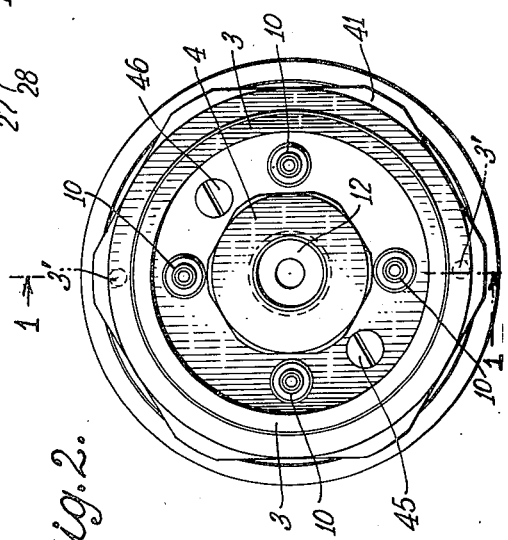
INVENTOR
WILLIAM A. BRUNO
BY
ATTORNEYS

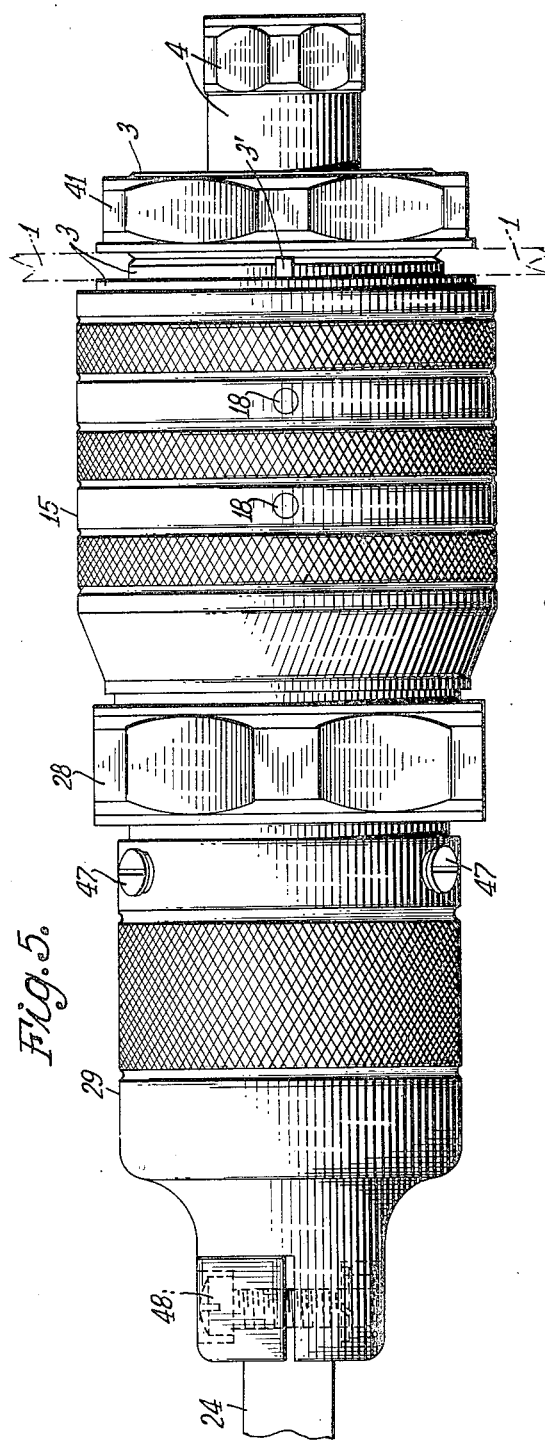
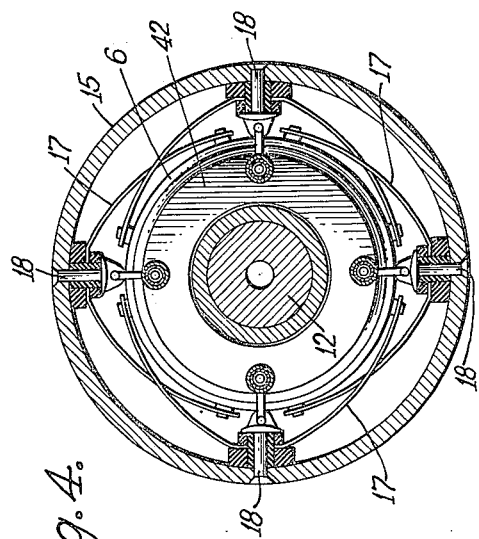

Patented July 28, 1942

2,291,070

UNITED STATES PATENT OFFICE 2,291,070

CONNECTING DEVICE

William A. Bruno, Astoria, N. Y., assignor to the firm Selectar Mfg. Corp., Long Island City, N. Y.

Application September 3, 1941, Serial No. 409,345

5 Claims. (Cl. 174—21)

The present invention relates to a revolving plug and jack assembly for supplying electric current and a gas to a rotatable structure, such as turrets of air-planes, for example.

It is one object of this invention to provide a plug and jack assembly, the parts of which can be easily assembled, and which, in assembled condition, forms a rotatable connecter adapted to conduct gas and electric current from stationary sources to a rotatable structure.

It is another object of my present invention to provide an assembly of the above mentioned type, in which the rotation of the rotatable parts takes place without causing any disturbing noise.

It is also an object of my invention to provide a gas-tight rotatably connecting device, in which no lubricants or the like, which are affected by chemically active gases, such as particularly oxygen, are used, and which is nevertheless adapted to conduct such gases without any substantial loss.

It is a further object of my invention to provide a plug and jack assembly, in which rotation of the rotatable parts can be easily caused under the action of a relatively small force, and which provides safe and perfect electrical contacts and a tight gaseous connection during rotation.

Other objects and advantages will appear from the following specification and the drawings forming a part of the same.

Referring to the drawings—

Fig. 1 is a longitudinal sectional view of a connecting device according to my invention, the section being taken along the line 1—1 of Fig. 2;

Fig. 2 is an end view looking at the right end, and

Fig. 3 is another end view looking at the left end of Fig. 1 in the drawings;

Fig. 4 is a sectional view taken along the line 4—4 of Fig. 1, and

Fig. 5 is an outside elevational view of the device.

Referring now to Fig. 1, 1 is a panel to which the assembly is fastened, 2 is a flanged metal tube which carries a flanged and threaded barrel 3, held in place by pins 3' and locking nut 41. A protecting element, which may preferably consist of felt, is inserted, as shown at 43, in order to prevent dust or similar impurities from entering into the device. The right end of this tube, viewed in the drawings, is threaded and carries a tube 4. The right end of said tube 4 has an inner pipe thread and is adapted to be connected with the oxygen supply pipe. A contact ring assembly is secured to the left part of said flanged tube 2. This contact ring assembly contains four contact rings 5 which are insulated from each other and from the tube by insulating parts 6. The contact ring assembly is held assembled by flanged tube 7 and disc 42. Each of the contact rings 5 has an electrically insulated duct bolt 9, and is connected with a soldering lug 10. The incoming four wire cable (not shown in the drawings) is connected with these soldering lugs 10. The parts and elements hitherto mentioned form the stationary part of the assembly which is secured to flanged barrel 3 by means of screws 45 and 46.

The revolving part of the jack assembly contains a first metallic tube 12, which is rotatable in the tubular bearing formed by tube 2, and provided on its right end with a thread and two nuts 13, threaded on said end. Rigidly secured to the rotatable tube 12 is a bell-shaped metallic body 15. This first body carries four contact prongs 16 properly insulated from body 15, each of which is electrically connected to a contact spring 17, which is also properly insulated from body 15. These contact springs are situated in four different planes in such a manner that each contact spring glides on one of the contact rings 5. Each of these springs is secured to the body 15 by a pair of properly insulated rivets 18. Body 15 is provided with a threaded annular extension 19 in order to accommodate locking nut 28.

The plug assembly comprises a second metallic body 20, which carries four contact receptacles properly insulated from body 20, into which the contact prongs 16 are inserted. The left end of the contact receptacles is provided with a soldering lug 21, to which the outgoing leads connected with the rotatable part of the assembly are soldered. The outgoing four wire cable is shown at 22. Said second body 20 is connected to and surrounds a second metal tube 23, the left end of which is adapted to be connected with the outgoing gas supply pipe 24. The left end of tube 12 is so shaped that a gas-tight connection is formed between said end and tube 23, a rubber packing 25 being interposed between the adjacent ends of tubes 12 and 23. Body 20 is flanged at 27, and by tightening nut 28, a gas-tight connection as well as a stable electrical connection can be obtained between the various parts in physical and electrical contact. Tube 29 is secured to tube 20 by means of screws 47, for example. Tube 29 is so constructed that its end, which is flattened and adapted to be fastened by screw 48, holds the electric cable and the gas tube, as best shown in Fig. 3.

As can be seen from the above description and the appended drawings, the parts of the connecter device shown can be easily assembled to an easily rotatable connecter which is capable of producing stable, perfect, electrical and gaseous connections between a rotating structure and a stationary gas and electric source, without substantial loss of gas, without the necessity of using a lubricant and without causing disturbing noises during rotation. By rotating the gaseous and electric cables secured to the plug, the rotatable connecter assembly can be easily rotated, tubes 12 and 23, bodies 15 and 20 secured to said tubes 12 and 23, respectively, and the parts connected with said bodies being thus smoothly rotated in the tubular bearing formed by tube 2, and safe, tight and permanent electrical and gaseous connections between a stationary electrical and gas supply and a rotating structure being thus obtained.

It is to be understood that the invention is not limited to the embodiment shown, but may be embodied in various equivalent forms, reference being had to the appended claims for a definition of the limits of the invention.

I claim:

1. A system for detachably coupling electrical and gas conducting means of a stationary structure and a rotatable structure, said system comprising a first rotatable, gas conducting tube, and an axially aligned, second rotatable, gas conducting tube having a gas-tight detachable connection with said first tube, one portion of said first tube being journalled in a stationary tube adapted to be connected with a stationary gaseous source, said stationary tube carrying on its outer surface stationary electric connecting means adapted to be connected with a stationary electric source, the remaining portion of said first rotatable tube carrying on its outer surface rotatable electric connecting means adapted to make rotatable contact with said stationary electric connecting means, said second rotatable tube carrying on its outer surface electric connecting means having a detachable connection with the rotatable electric connecting means.

2. A system for detachably coupling electrical and gas conducting means of a stationary structure and a rotatable structure, said system comprising a first rotatable, gas conducting tube, and an axially aligned, second rotatable, gas conducting tube having a gas-tight detachable connection with said first tube, one portion of said first tube being journalled in a stationary tube, adapted to be connected with a stationary gaseous source, said stationary tube carrying on its outer surface stationary electric contact rings adapted to be connected with a stationary electric source, the remaining portion of said first rotatable tube carrying on its outer surface contact springs adapted to make rotatable contact with said stationary contact rings, said second rotatable tube carrying on its outer surface electric connecting means having a detachable connection with the contact springs.

3. A system for detachably coupling electrical and gas conducting means of a stationary structure and a rotatable structure, said system comprising a first rotatable, gas conducting tube, and an axially aligned, second rotatable, gas conducting tube having a gas-tight detachable connection with said first tube and adapted to be connected with said rotatable structure, one portion of said first tube being journalled in a stationary tube adapted to be connected with a stationary gaseous source, said stationary tube carrying on its outer surface stationary electric contact rings adapted to be connected with a stationary electric source, the remaining portion of said first rotatable tube carrying on its outer surface a first body containing electric contact springs adapted to make rotatable contact with said stationary contact rings, said second rotatable tube carrying on its outer surface a second body containing electric connecting means having a detachable connection with the contact springs and having outgoing electric connecting means adapted to be connected with said rotatable structure.

4. A system for detachably coupling electrical and gas conducting means of a stationary structure and a rotatable structure, said system comprising a first rotatable, gas conducting tube, and an axially aligned, second rotatable, gas conducting tube having a gas-tight detachable connection with said first tube and adapted to be connected with said rotatable structure, one portion of said first tube being journalled in a stationary tube adapted to be connected with a stationary gaseous source, said stationary tube carrying on its outer surface stationary electric contact rings adapted to be connected with a stationary electric source, the remaining portion of said first rotatable tube carrying on its outer surface a first body containing electric contact springs adapted to make rotatable contact with said stationary contact rings, said second rotatable tube carrying on its outer surface a second body containing electric connecting means having detachable connection with the electrical contact springs, and having outgoing electric connecting means adapted to be connected with said rotatable structure, a holding tube connected to said second body, said tube housing electric leads adapted to form electrical connection between said outgoing electric connecting means and the rotatable structure, and gas conducting means adapted to form a gas conducting connection between the second rotatable, gas conducting tube and the rotatable structure.

5. A system for detachably coupling electrical and gas conducting means of a stationary structure and a rotatable structure, said system comprising a first rotatable, gas conducting tube, and an axially aligned, second rotatable, gas conducting tube having a gas-tight detachable connection with said first tube, one portion of said first tube being journalled in a stationary tube, adapted to be connected with a stationary gaseous source, said stationary tube carrying on its outer surface stationary electric contact rings adapted to be connected with a stationary electric source, the remaining portion of said first rotatable tube carrying on its outer surface contact springs adapted to make rotatable electrical parallel contacts with said stationary contact rings at two spaced points, said second rotatable tube carrying on its outer surface electric connecting means having a detachable connection with the contact springs.

WILLIAM A. BRUNO.